United States Patent
Lin et al.

(10) Patent No.: US 7,324,088 B2
(45) Date of Patent: Jan. 29, 2008

(54) LOCUS SMOOTHING METHOD AND POINTING DEVICE UTILISING THE SAME

(75) Inventors: Chun-Huang Lin, Hsinchu (TW); Jeng-Feng Lan, Hsinchu (TW)

(73) Assignee: PixArt Imaging Inc., HsinOChu (TW)

( * ) Notice: Subject to any disclaimer, the term of this patent is extended or adjusted under 35 U.S.C. 154(b) by 663 days.

(21) Appl. No.: 10/827,196

(22) Filed: Apr. 19, 2004

(65) Prior Publication Data

US 2005/0146503 A1 Jul. 7, 2005

(30) Foreign Application Priority Data

Jan. 7, 2004 (TW) ................ 93100324 A (51) Int. Cl.
*G06F 1/32* (2006.01)
(52) U.S. Cl. ...................................... 345/163
(58) Field of Classification Search ............... 345/163, 345/166, 164–165, 167; 178/18.01; 250/221; 715/857–859; 348/141
See application file for complete search history.

(56) References Cited

U.S. PATENT DOCUMENTS 6,509,889 B2 * 1/2003 Kamper et al. ............ 345/157
7,098,889 B2 * 8/2006 Inui et al. ................... 345/156
7,126,582 B2 * 10/2006 Osborn ....................... 345/157
7,161,585 B2 * 1/2007 Lauffenburger et al. .... 345/166

FOREIGN PATENT DOCUMENTS

TW         200301867         7/2003

* cited by examiner

Primary Examiner—Richard Hjerpe
Assistant Examiner—Abbas I. Abdulselam
(74) Attorney, Agent, or Firm—Tung & Associates (57) ABSTRACT

A pointing device with a locus smoothing function. The pointing device comprises a locus processing circuit receiving a digitized displacement and executing an accumulation procedure to generate an accumulated value of displacement, wherein when the accumulated value satisfies a preset condition, the accumulated value is output to a processing device for smoothing a locus of a pointer on a display device and a reset procedure is executed to reset the accumulated value.

6 Claims, 11 Drawing Sheets

| Relative Displacement of Mouse (X,Y) | Present Accumulated Value (X_acu, Y_acu) | Output Displacement |
|---|---|---|
| | (0,0) | |
| (1,0) | (1,0) | |
| (0,2) | (1,2) | (1,2) |
| | (0,0) | |
| (2,0) | (2,0) | |
| (1,0) | (3,0) | |
| (0,3) | (3,3) | (3,3) |
| | (0,0) | |
| (5,0) | (5,0) | |
| (0,5) | (5,5) | (5,5) |
| | (0,0) | |

| Relative Displacement of Mouse (X,Y) | Present Accumulated Value (X_acu,Y_acu) | Output Displacement |
|---|---|---|
|  | (0,0) |  |
| (1,0) | (1,0) |  |
| (0,2) | (1,2) |  |
| (2,0) | (3,2) | (3,2) |
|  | (0,0) |  |
| (1,0) | (1,0) |  |
| (0,3) | (1,3) | (1,3) |
|  | (0,0) |  |
| (5,0) | (5,0) | (5,0) |
|  | (0,0) |  |
| (0,5) | (0,5) | (0,5) |
|  | (0,0) |  |

LOCUS SMOOTHING METHOD AND POINTING DEVICE UTILISING THE SAME

BACKGROUND OF THE INVENTION

1. Field of the Invention

The present invention relates to a pointing device and a locus smoothing method, and in particular to a pointing device with a locus smoothing function and a locus smoothing method appropriate for the pointing device.

2. Description of the Related Art

A mouse is a commonly used input device. A wheel mouse processes a displacement signal, a button signal, and an interface signal and communicates with a computer via a PS2 interface, a universal serial bus (USB) interface, or a wireless communication interface using the mechanical structure of its wheel and a micro-controller chip. An optical mouse replaces the mechanical structure of the wheel mouse with a complementary metal oxide semiconductor (CMOS) photo sensor chip capable of optical navigation. When a mouse moves, its displacement is output to a computer sequentially. While the displacement is digitized by the mechanical structure of the wheel mouse or the CMOS photo sensor chip of the optical mouse to be discrete, rather than continuous in original analog format. If the mouse moves at a small angle or an error occurs in the progress of digitization, a right angle is unavoidable in the locus of the mouse even if the mouse moves slowly and smoothly.

Figure 1:
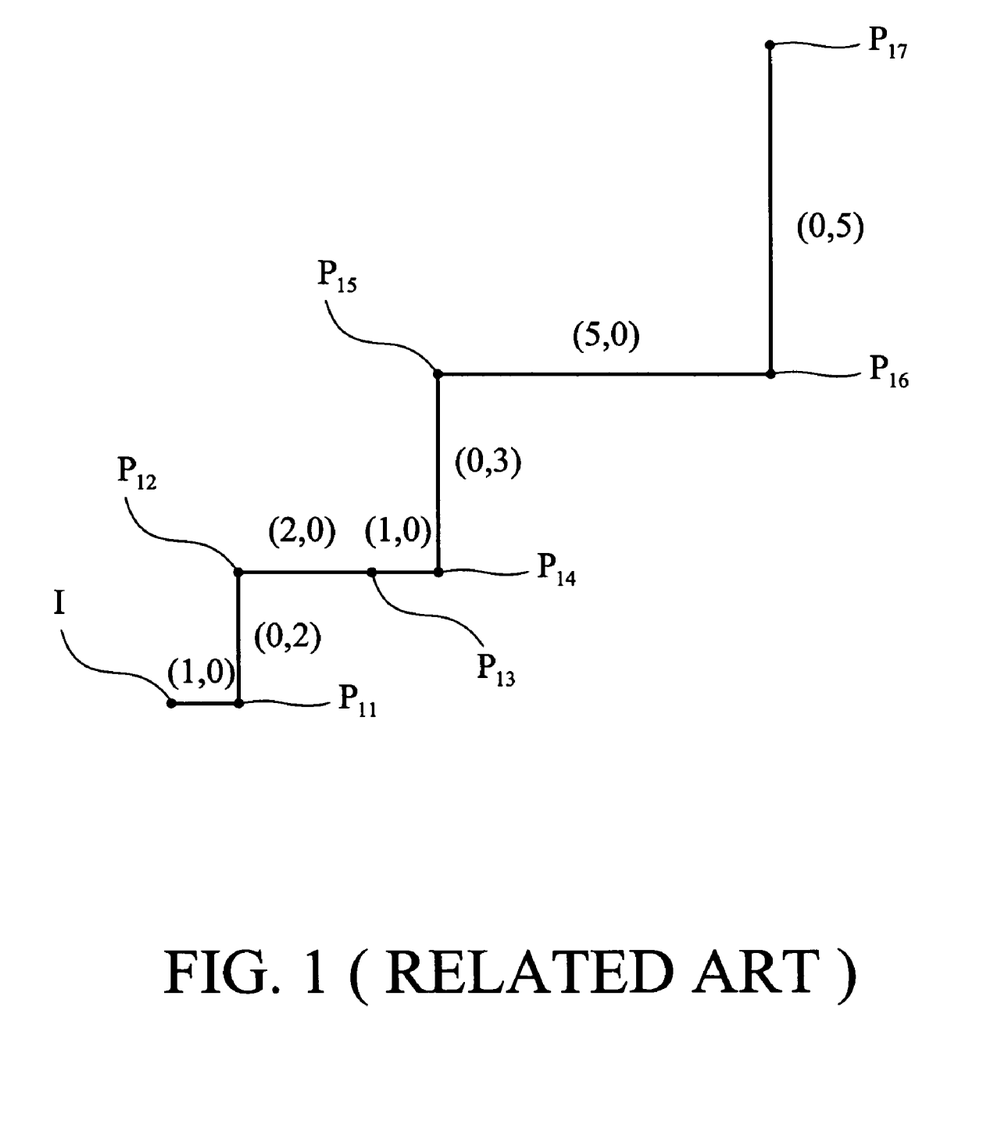
FIG. 1 shows a locus of movement of the conventional mouse.

FIG. 1 shows a locus of movement of the conventional mouse. The conventional mouse outputs detected input displacements to a computer without any additional processing. As shown in FIG. 1, I indicates the origin of mouse movement, the input values of displacement are $P_{11}(1,0)$, $P_{12}(0,2)$, $P_{13}(2,0)$, $P_{14}(1,0)$, $P_{15}(0,3)$, $P_{16}(5,0)$, and $P_{17}(0,5)$, wherein each input value indicates the displacement from the previous to the current position. When the input values are sequentially output to the computer, the locus of movement of the conventional mouse is a zigzag with some right angles as shown in FIG. 1. This is unacceptable.

SUMMARY OF THE INVENTION

Accordingly, the present invention provides a pointing device with a locus smoothing function, comprising a locus processing circuit receiving a digitized displacement and executing an accumulation procedure to generate an accumulated value of displacement, in which the digitized displacement comprises a plurality of directional displacements having at least a first directional displacement and a second directional displacement, the accumulated value comprises a plurality of directional accumulated values having at least a first directional accumulated value and a second directional accumulated value, and the accumulation procedure accumulates the first directional displacement to yield the first directional accumulated value, and the second directional displacement to yield the second directional accumulated value, wherein when the accumulated value satisfies a preset condition, the accumulated value is output to a processing device for smoothing a locus of a pointer on a display device and a reset procedure is executed to reset the accumulated value. Preferably, the preset condition is thus: that the first directional accumulated value is not equal to a first preset value and the second directional accumulated value is not equal to a second preset value such that the first preset value is 0 and the second preset value is 0."

The present invention also provides a locus smoothing method, appropriate for a pointing device, comprising the steps of receiving a digitized displacement and executing an accumulation procedure to generate an accumulated value of displacement, in which the diqitized displacement comprises a plurality of directional displacements having at least a first directional displacement and a second directional displacement, the accumulated value comprises a plurality of directional accumulated values having at least a first directional accumulated value and a second directional accumulated value, and the accumulation procedure accumulates the first directional displacement to yield the first directional accumulated value, and the second directional displacement to yield the second directional accumulated valuer, and determining whether the accumulated value satisfies a preset condition, if so, the accumulated value is output to a processing device for smoothing a locus of a pointer on a display device and a reset procedure is executed to reset the accumulated value. Preferably, the preset condition is thus: that the first directional accumulated value is not equal to a first preset value and the second directional accumulated value is not equal to a second preset value such that the first preset value is 0 and the second preset value is 0."

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 2:
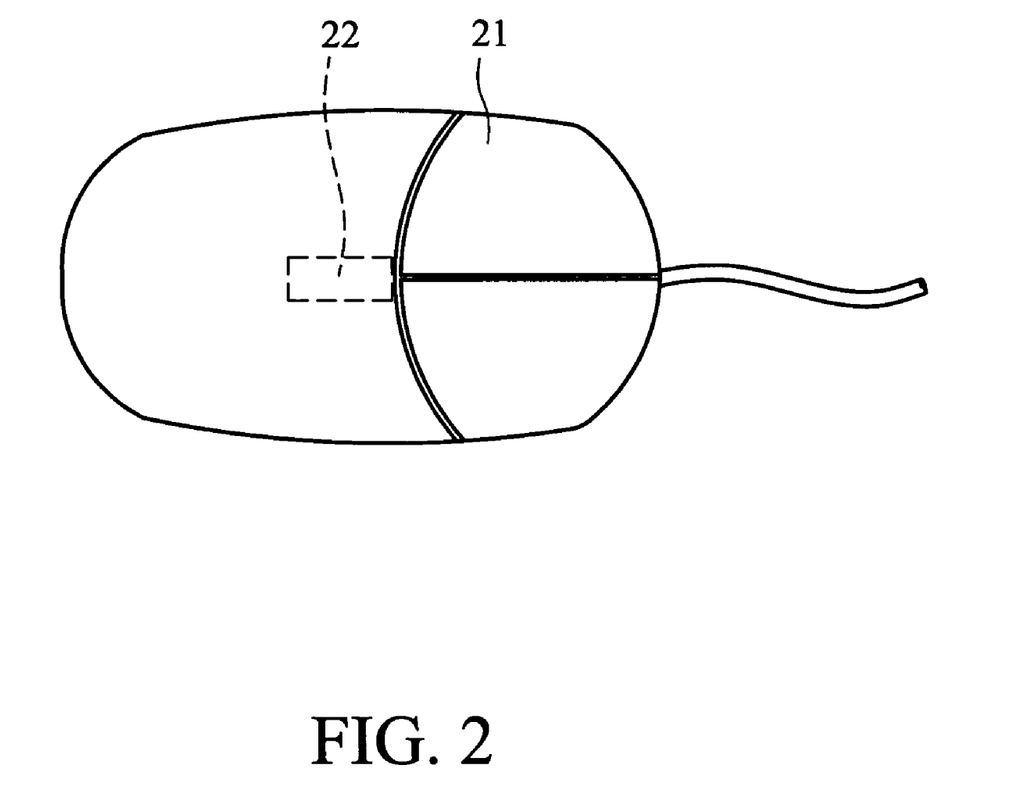
FIG. 2 shows a mouse and a locus processing circuit of the present invention.
Figure 3:
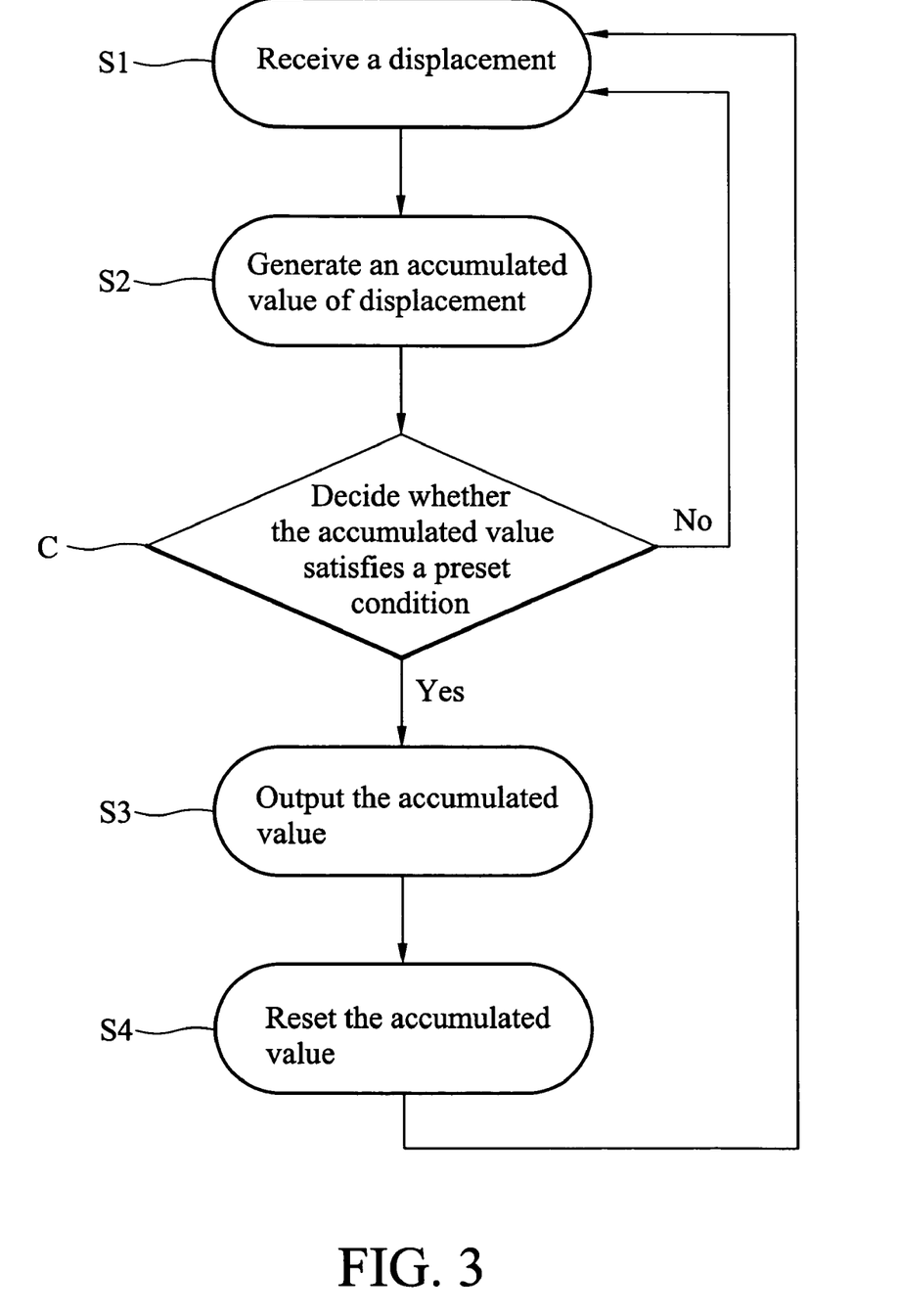
FIG. 3 is a flowchart showing the process of a locus smoothing method of the present invention.

FIG. 2 shows a mouse 21 and a locus processing circuit 22 of the present invention. As shown in FIG. 2, the mouse 21 comprises a locus processing circuit 22 with a locus smoothing function. FIG. 3 is a flowchart showing the process of a locus smoothing method of the present invention. As shown in FIG. 3, the process starts at step S1. At step S1, the locus processing circuit 22 receives a digitized displacement each time the mouse 21 moves. At step S2, the locus processing circuit 22 executes an accumulation procedure to generate an accumulated value of displacement. In conditional C, the locus processing circuit 22 determines whether the accumulated value satisfies a preset condition, if so, the process continues to the next step S3, if not, the process goes back to step S1 and stays in standby until the next move of the mouse 21. At step S3, the locus processing circuit 22 outputs the accumulated value to a computer for smoothing a locus of a pointer on a monitor of the computer. Final, at step S4, the locus processing circuit 22 executes a reset procedure to reset the accumulated value and wait for the next move of the mouse 21.

First Embodiment

In the first embodiment, each time the mouse 21 moves, the displacement from the previous to the current position is digitized to be an original input value of the mouse 21. The mouse 21 comprises a locus processing circuit 22 further comprising a register (not shown in drawings) and a processing unit (not shown in drawings). The processing unit accumulates the displacement to yield an accumulated value and stores the accumulated value in the register. Then, the processing unit determines whether output of the accumulated value is allowed.

Figure 4:
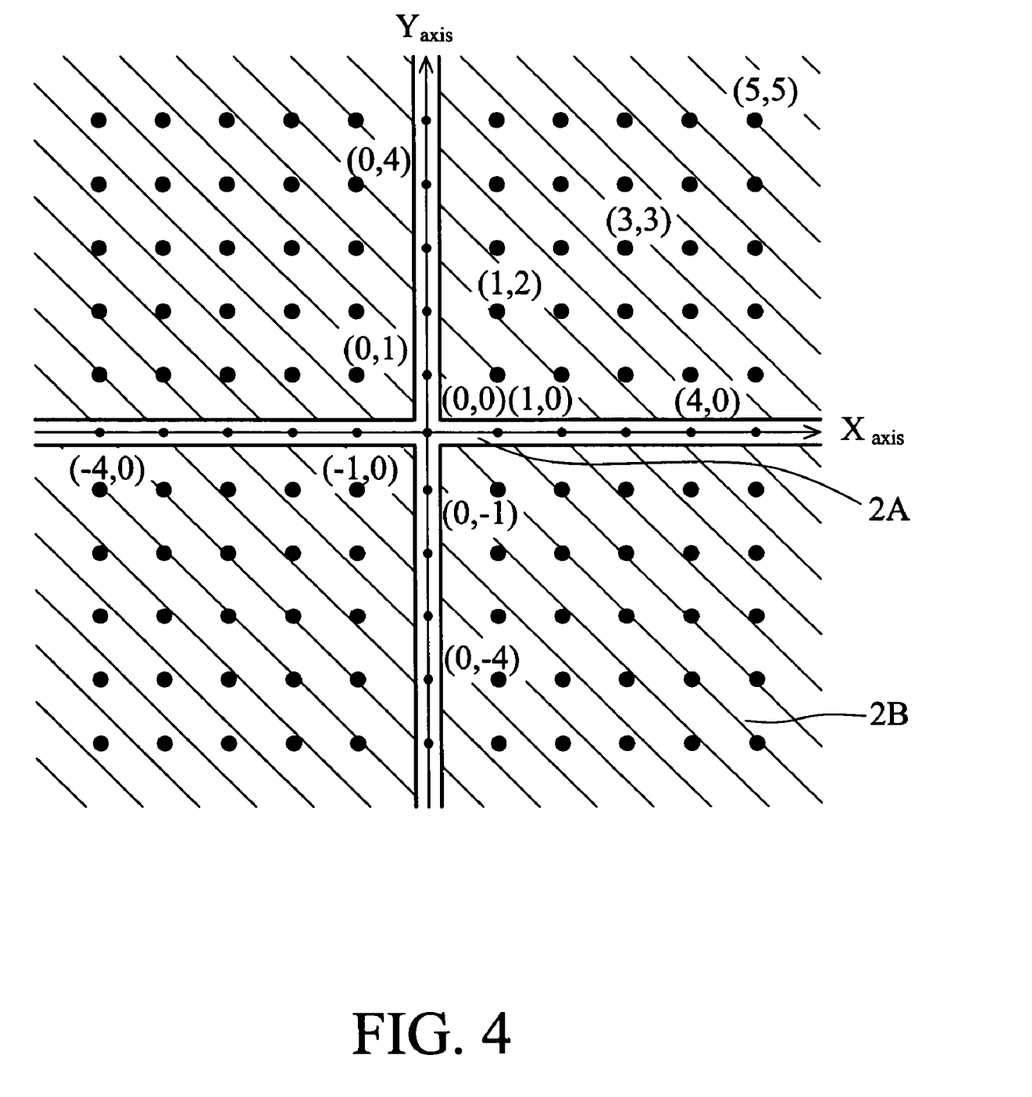
FIG. 4 shows an allowable region for outputting an accumulated value of displacement of the mouse in the first embodiment of the present invention.

FIG. 4 shows the allowable region 2B for outputting the accumulated value of the mouse 21. 2A represents the forbidden region where output of the accumulated value is disallowed. 2B represents the allowable region where output of the accumulated value is allowed. Put simply, if the coordinate value of the accumulated value belongs to the group of small dots in FIG. 4, output of the accumulated value is disallowed. If the coordinate value of the accumulated value belongs to the group of large dots in FIG. 4, output of the accumulated value is allowed.

Figure 5:
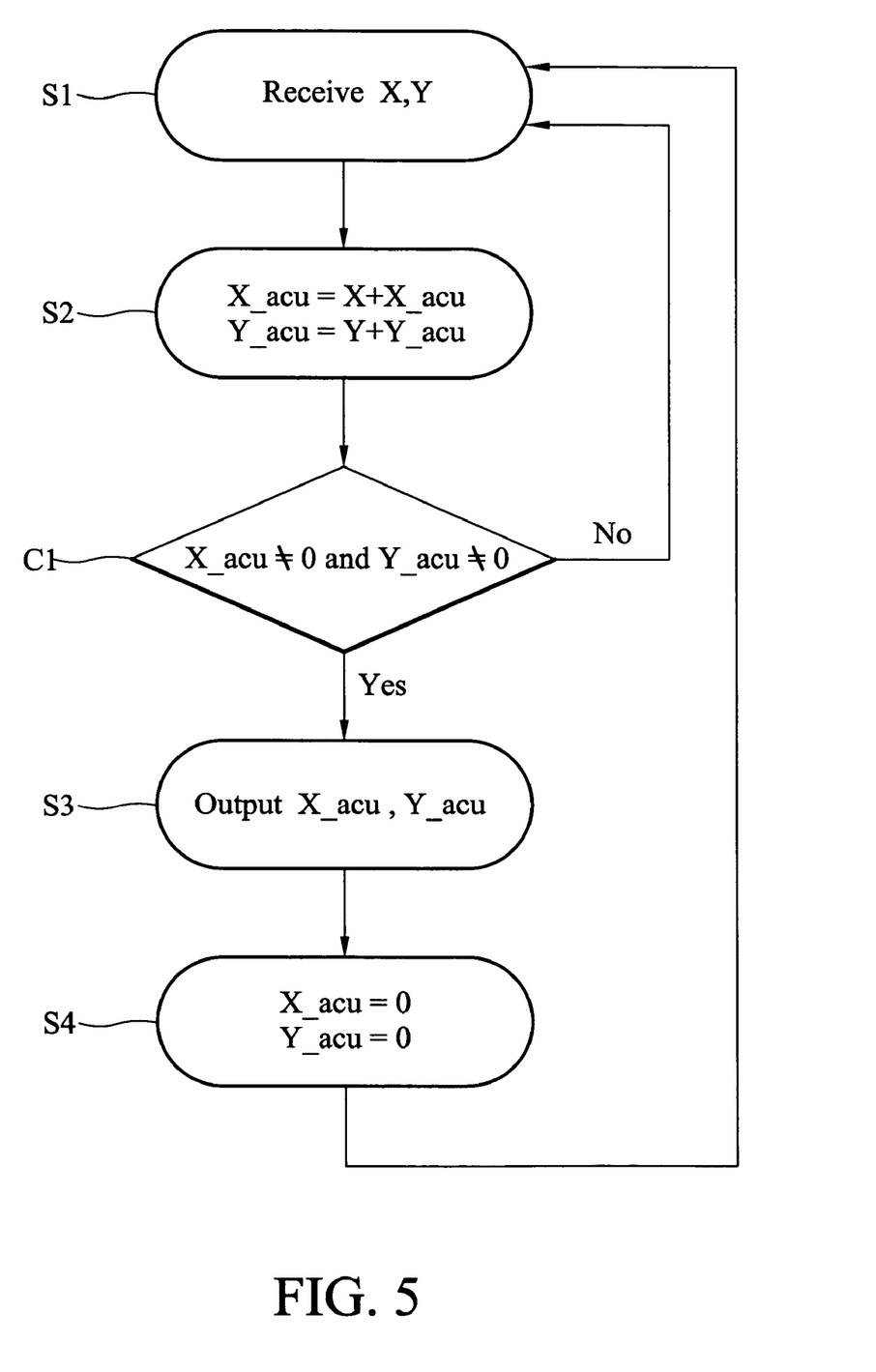
FIG. 5 is a flowchart showing the process for determining whether output of an accumulated value of displacement of the mouse in the first embodiment of the present invention is allowed.

FIG. 5 is a flowchart showing the process for determining whether output of the accumulated value of the mouse 21 is allowed. First, each time the mouse 21 moves, the displacement (X,Y) from the previous to the current position is digitized to be an original input value of the mouse 21 (STEP S1). Next, the displacement is accumulated to yield the accumulated value (X_acu, Y_acu) by executing formulas X_acu=X+X_acu and Y_acu=Y+Y_acu. The result is then stored in the register (STEP S2). The processing unit determines whether output of the accumulated value (X_acu, Y_acu) is allowed. The conditional C1 is shown in FIG. 5 as "X_acu≠0 and Y_acu≠0". If the conditional C1 is true, output of the accumulated value (X_acu, Y_acu) is allowed (STEP S3). Then, the processing unit resets the accumulated value (X_acu, Y_acu) to (0,0) and stays in standby until the next move of the mouse 21 (STEP S4). If the conditional C1 is false, the process goes back to the first step S1.

Figure 6:
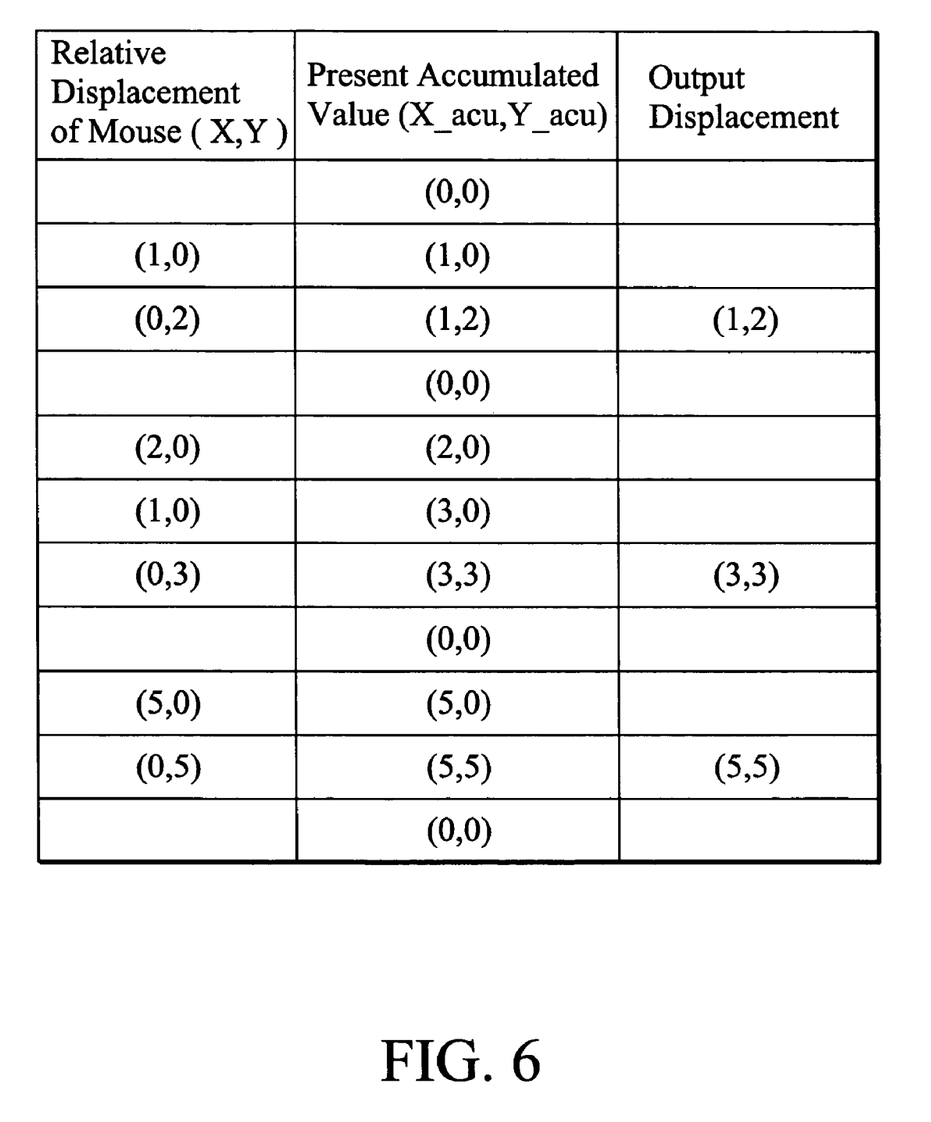
FIG. 6 is a table showing values generated by the process in FIG. 5.

FIG. 6 is a table showing values generated by the process in FIG. 5. For comparison, this embodiment uses the input values of displacement in FIG. 1 as its input values. Therefore, referring to FIG. 1, I indicates the origin of mouse movement, the input values are $P_{11}(1,0)$, $P_{12}(0,2)$, $P_{13}(2,0)$, $P_{14}(1,0)$, $P_{15}(0,3)$, $P_{16}(5,0)$, and $P_{17}(0,5)$, wherein each input value indicates the displacement from the previous to the current position. As shown in FIG. 6, when the accumulated value is (1,2), (3,3), or (5,5), the conditional C1 in FIG. 5 is true, thus output of the accumulated value is allowed. In addition, referring to FIG. 4, the accumulated values (1,2), (3,3), and (5,5) all belong to the group of large dots in the allowable region 2B where output of the accumulated value is allowed, in accordance with the process in FIG. 5.

Figure 7:
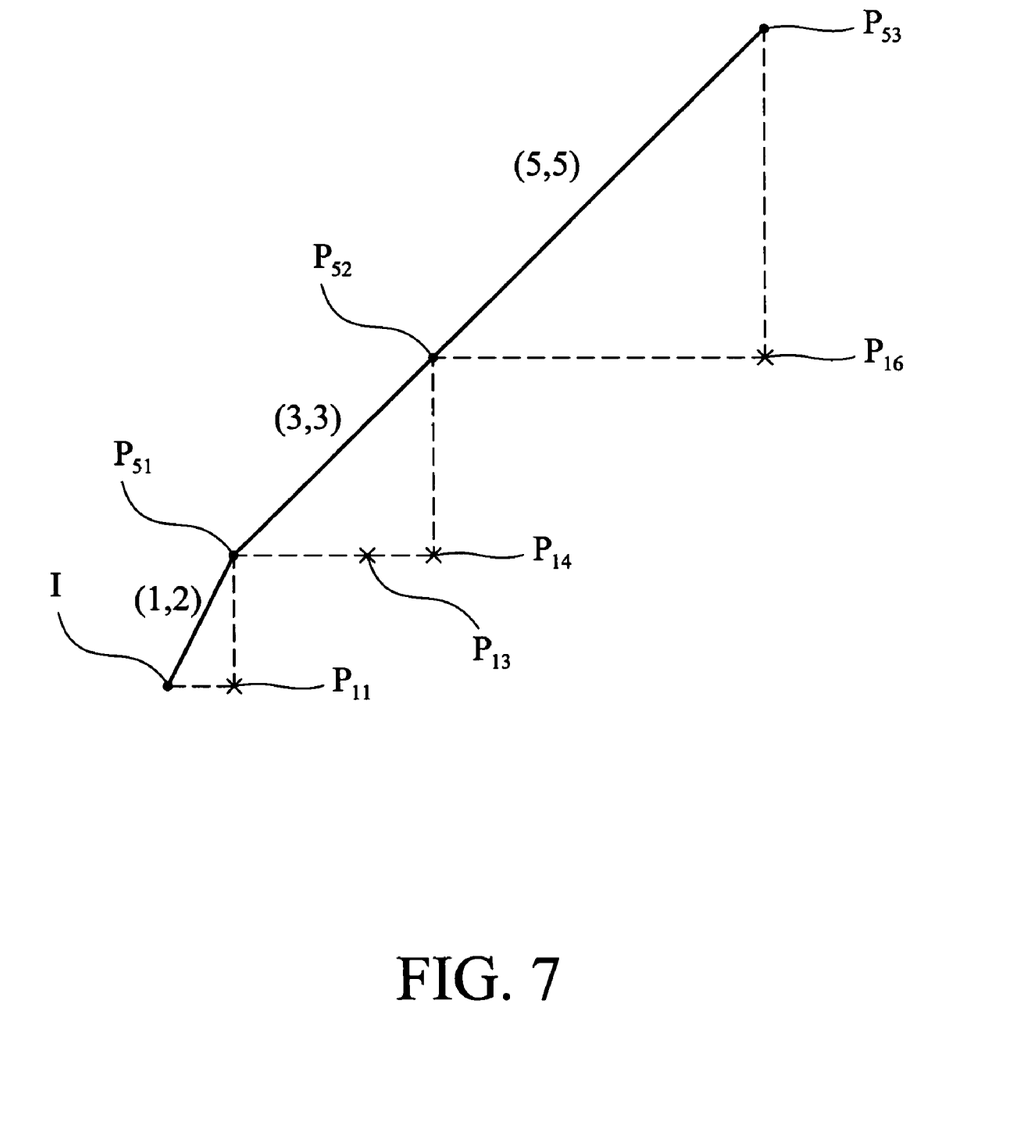
FIG. 7 shows a locus of movement of the mouse in the first embodiment of the present invention.

FIG. 7 shows a locus of movement of the mouse 21 of the present invention. As shown in FIG. 7, when the accumulated values $P_{51}(1,2)$, $P_{52}(3,3)$, and $P_{53}(5,5)$ are sequentially output to the computer, the locus of movement of the mouse 21 is represented by the connection line from I to P51, P52, and P53 as the solid line therein. Compared with the locus without additional processing (as indicated by the dotted line in FIG. 7), the locus of this embodiment (as indicated by the solid line in FIG. 7) has fewer right angles and smoother movement.

Second Embodiment

In the second embodiment, each time the mouse 21 moves, the displacement from the previous to the current position is digitized to be an original input value of the mouse 21. The mouse 21 comprises a locus processing circuit 22 further comprising a register (not shown in drawings) and a processing unit (not shown in drawings). The processing unit accumulates the displacement to yield an accumulated value and stores the accumulated value in the register. Then, the processing unit determines whether output of the accumulated value is allowed.

Figure 8:
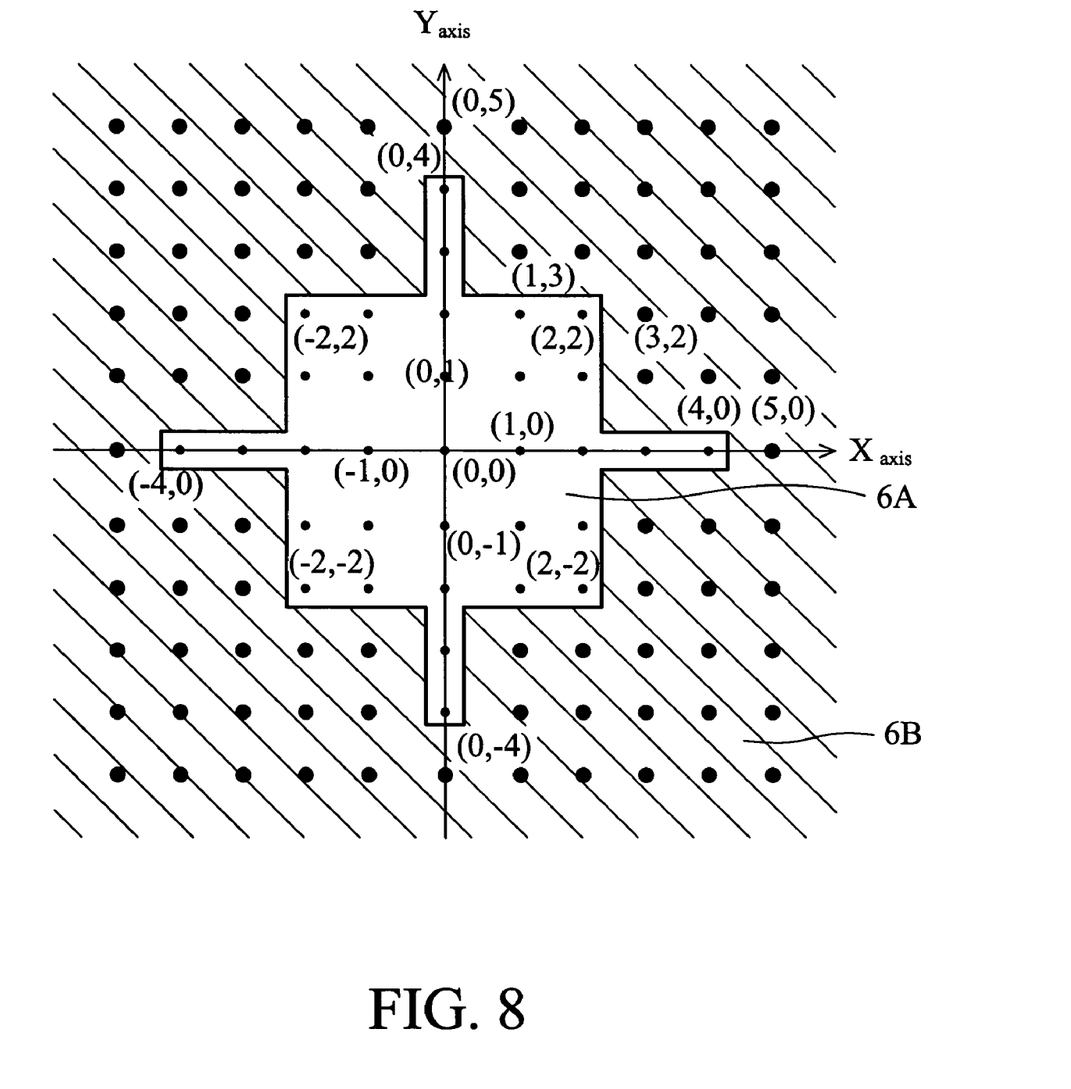
FIG. 8 shows an allowable region for outputting an accumulated value of displacement of the mouse in the second embodiment of the present invention.

FIG. 8 shows the allowable region 6B for outputting the accumulated value of the mouse 21. 6A represents the forbidden region where output of the accumulated value is disallowed. 6B represents the allowable region where output of the accumulated value is allowed. Put simply, if the coordinate value of the accumulated value belongs to the group of small dots in FIG. 8, output of the accumulated value is disallowed. If the coordinate value of the accumulated value belongs to the group of large dots in FIG. 8, output of the accumulated value is allowed.

Figure 9:
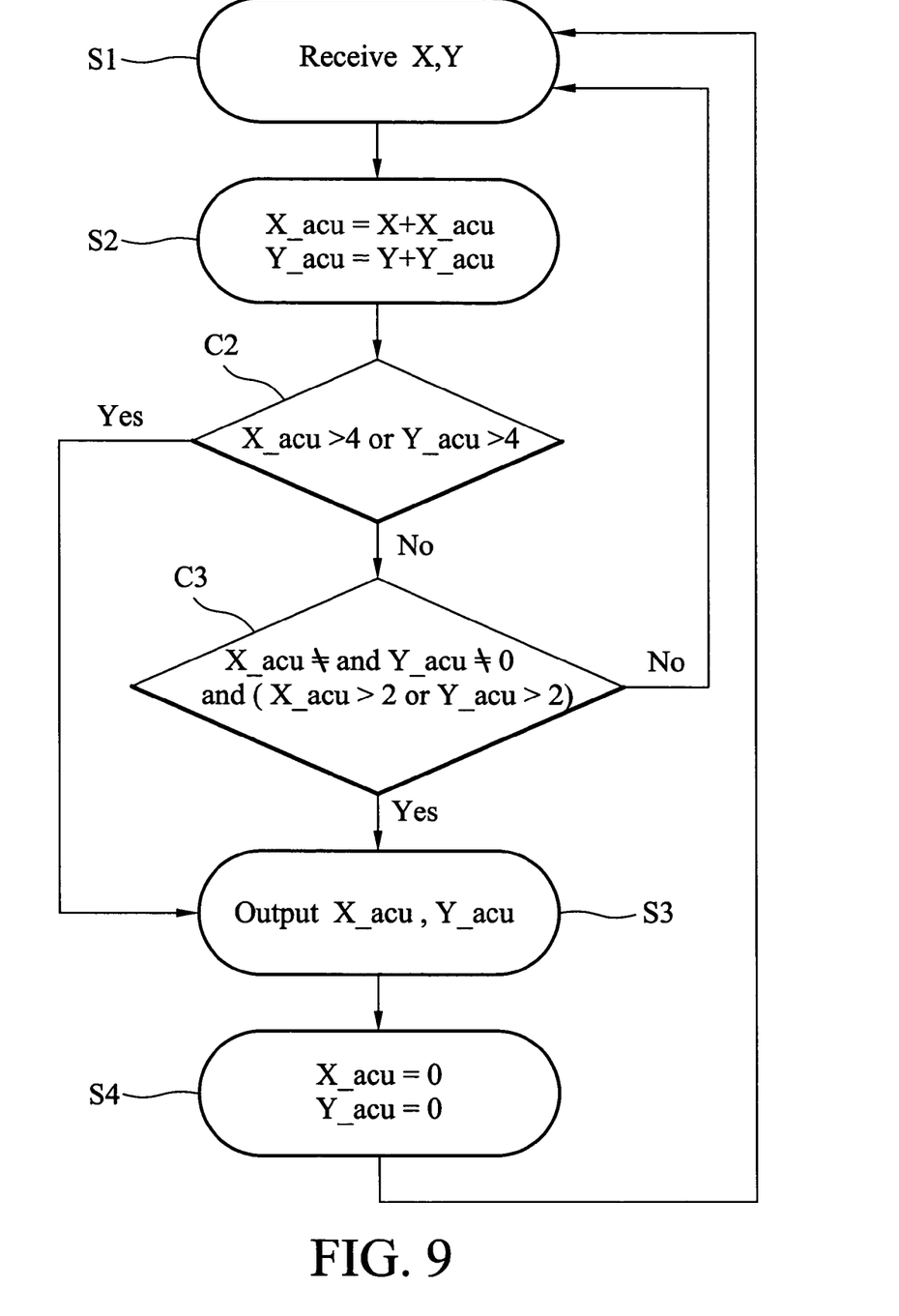
FIG. 9 is a flowchart showing the process for determining whether output of an accumulated value of displacement of the mouse in the second embodiment of the present invention is allowed.

FIG. 9 is a flowchart showing the process for determining whether output of the accumulated value of the mouse 21 is allowed. First, each time the mouse 21 moves, the displacement (X,Y) from the previous to the current position is digitized to be an original input value of the mouse 21 (STEP S1). Next, the displacement is accumulated to yield the accumulated value (X_acu, Y_acu) by executing formulas X_acu=X+X_acu and Y_acu=Y+Y_acu. The result is then stored in the register (STEP S2). The processing unit determines whether output of the accumulated value (X_acu, Y_acu) is allowed. The first conditional C2 is shown in FIG. 9 as "X_acu>4 or Y_acu>4". If the first conditional C2 is true, output of the accumulated value (X_acu, Y_acu) is allowed (STEP S3). Then, the processing unit resets the accumulated value (X_acu, Y_acu) to (0,0) and stays in standby until the next move of the mouse 21 (STEP S4). If the first conditional C2 is false, the process continues to the second conditional C3. The second conditional C3 is shown in FIG. 9 as "X_acu≠0 and Y_acu≠0 and (X_acu>2 or Y_acu>2)". If the second conditional C3 is true, output of the accumulated value (X_acu, Y_acu) is allowed (STEP S3). Then, the processing unit resets the accumulated value (X_acu, Y_acu) to (0,0) and stays in standby until the next move of the mouse 21 (STEP S4). If the second conditional C3 is false, the process returns to the first step S1.

Figure 10:
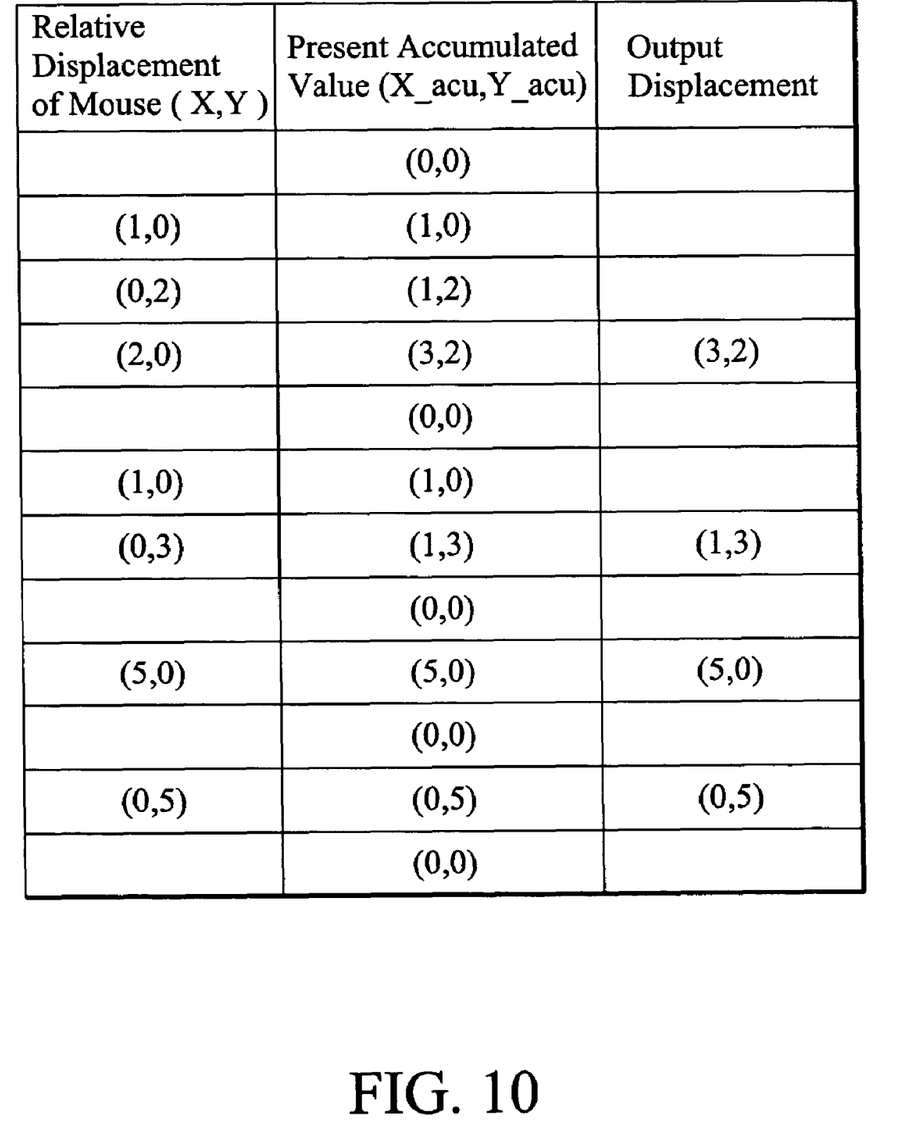
FIG. 10 is a table showing values generated by the process in FIG. 9.

FIG. 10 is a table showing values generated by the process in FIG. 9. For comparison, this embodiment uses the input values of displacement in FIG. 1 as its input values. Therefore, referring to FIG. 1, I indicates the origin of mouse movement, the input values are $P_{11}(1,0)$, $P_{12}(0,2)$, $P_{13}(2,0)$, $P_{14}(1,0)$, $P_{15}(0,3)$, $P_{16}(5,0)$, and $P_{17}(0,5)$, wherein each input value indicates the displacement from the previous to the current position. As shown in FIG. 10, when the accumulated value is (3,2), (1,3), (5,0), or (0,5), the first conditional C2, the second conditional C3, or both in FIG. 9 is true, thus output of the accumulated value is allowed. In addition, referring to FIG. 8, the accumulated values (3,2), (1,3), (5,0), and (0,5) all belong to the group of large dots in the allowable region 6B where output of the accumulated value is allowed, in accordance with the process in FIG. 9.

Figure 11:
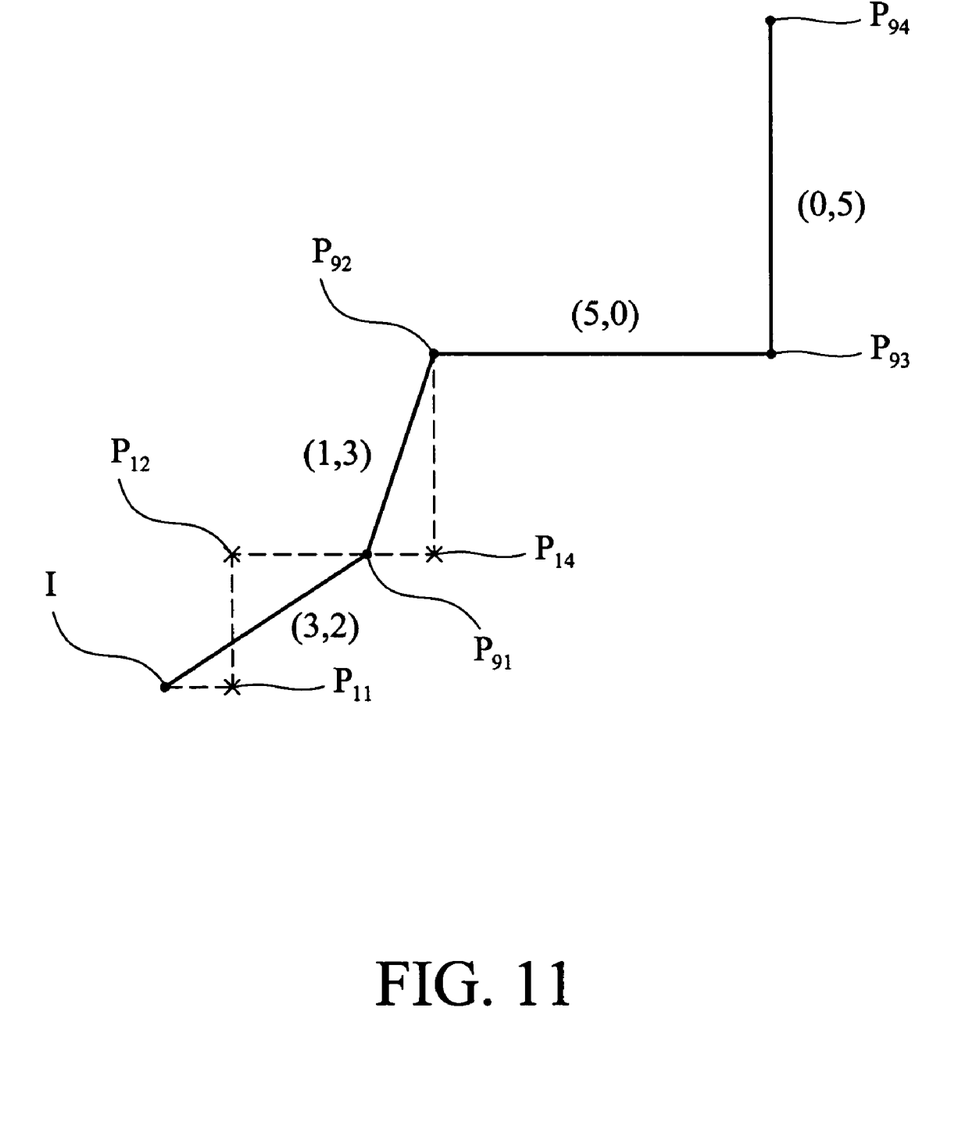
FIG. 11 shows a locus of movement of the mouse in the second embodiment of the present invention.

FIG. 11 shows a locus of movement of the mouse 21 of the present invention. As shown in FIG. 11, when the accumulated values $P_{91}(3,2)$, $P_{92}(1,3)$, $P_{93}(5,0)$, and $P_{94}(0,5)$ are sequentially output to the computer, the locus of movement of the mouse 21 is represented by the connection line from I to P91, P92, P93, and P94 as the solid line therein. Compared with the locus without additional processing (as indicated by the dotted line in FIG. 11), the locus of this embodiment (as indicated by the solid line in FIG. 11) has fewer right angles and smoother movement.

It is to be understood that the invention is not limited to the disclosed conditionals C1, C2, and C3 in FIGS. 5 and 9. Any appropriate conditional can be used by the processing unit of the mouse 21 of the present invention to output various accumulated values to the computer, thereby smoothing the locus of movement of the mouse 21.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A pointing device with a locus smoothing function, comprising:
a locus processing circuit receiving a digitized displacement and executing an accumulation procedure to generate an accumulated value of displacement, in which the digitized displacement comprises a plurality of directional displacements having at least a first directional displacement and a second directional displacement, the accumulated value comprises a plurality of directional accumulated values having at least a first directional accumulated value and a second directional accumulated value, and the accumulation procedure accumulates the first directional displacement to yield the first directional accumulated value, and the second directional displacement to yield the second directional accumulated value;
wherein when the accumulated value satisfies a preset condition that the first directional accumulated value is not equal to a first preset value and the second directional accumulated value is not equal to a second preset value such that the first preset value is 0 and the second preset value is 0, the accumulated value is output to a processing device for smoothing a locus of a pointer on a display device and a reset procedure is executed to reset the accumulated value.

2. A pointing device with a locus smoothing function, comprising:
a locus processing circuit receiving a digitized displacement and executing an accumulation procedure to generate an accumulated value of displacement, in which the digitized displacement comprises a plurality of directional displacements having at least a first directional displacement and a second directional displacement, the accumulated value comprises a plurality of directional accumulated values having at least a first directional accumulated value and a second directional accumulated value, and the accumulation procedure accumulates the first directional displacement to yield the first directional accumulated value, and the second directional displacement to yield the second directional accumulated value;
wherein when the accumulated value satisfies a preset condition that the first directional accumulated value is not equal to 0, the second directional accumulated value is not equal to 0, and the first directional accumulated value is greater than 2 or the second directional accumulated value is greater than 2, wherein when the first directional accumulated value is greater than 4 or the second directional accumulated value is greater than 4, the accumulated value is output to a processing device for smoothing a locus of a pointer on a display device and a reset procedure is executed to reset the accumulated value.

3. A locus smoothing method, appropriate for a pointing device, comprising the steps of:
receiving a digitized displacement and executing an accumulation procedure to generate an accumulated value of displacement, in which the digitized displacement comprises a plurality of directional displacements having at least a first directional displacement and a second directional displacement, the accumulated value comprises a plurality of directional accumulated values having at least a first directional accumulated value and a second directional accumulated value, and the accumulation procedure accumulates the first directional displacement to yield the first directional accumulated value, and the second directional displacement to yield the second directional accumulated value; and
determining whether the accumulated value satisfies a preset condition that the first directional accumulated value is not equal to a first preset value and the second directional accumulated value is not equal to a second preset value such that the first preset value is 0 and the second preset value is 0, if so, the accumulated value is output to a processing device for smoothing a locus of a pointer on a display device and a reset procedure is executed to reset the accumulated value.

4. A locus smoothing method, appropriate for a pointing device, comprising the steps of:
receiving a digitized displacement and executing an accumulation procedure to generate an accumulated value of displacement, in which the digitized displacement comprises a plurality of directional displacements having at least a first directional displacement and a second directional displacement, the accumulated value comprises a plurality of directional accumulated values having at least a first directional accumulated value and a second directional accumulated value, and the accumulation procedure accumulates the first directional displacement to yield the first directional accumulated value, and the second directional displacement to yield the second directional accumulated value; and
determining whether the accumulated value satisfies a preset condition that the first directional accumulated value is not equal to a first preset value, the second directional accumulated value is not equal to a second preset value, and the first directional accumulated value is greater than a third preset value or the second directional accumulated value is greater than a fourth preset value, wherein before the step of determining whether the accumulated value satisfies a preset condition, the method further comprises the step of:

determining whether the first directional accumulated value is greater than a fifth preset value or the second directional accumulated value is greater than a sixth preset value, if so, the accumulated value is output to the processing device for smoothing a locus of a pointer on a display device and a reset procedure is executed to reset the accumulated value.

5. The locus smoothing method as claimed in claim 4, wherein the first preset value is 0, the second preset value is 0, the third preset value is 2, the fourth preset value is 2, the fifth preset value is 4, and the sixth preset value is 4.

6. The locus smoothing method as claimed in claim 4, wherein the reset procedure resets the first directional accumulated value to 0 and the second directional accumulated value to 0.

* * * * *